United States Patent [19]

Orain

[11] 4,429,925
[45] Feb. 7, 1984

[54] BALL BEARING METHOD FOR ASSEMBLING THE BEARING AND AN APPARATUS FOR GRINDING THE BEARING

[75] Inventor: Michel A. Orain, Conflans Sainte Honorine, France

[73] Assignee: Glaenzer Spicer, Poissy, France

[21] Appl. No.: 361,068

[22] Filed: Mar. 23, 1982

[30] Foreign Application Priority Data

Mar. 25, 1981 [FR] France ................... 81 05976

[51] Int. Cl.³ ............ F16C 13/00; F16C 33/58; B24B 1/00; B24B 5/00
[52] U.S. Cl. ............... 308/189 R; 308/189 A; 308/193; 308/198; 51/291; 51/101 R
[58] Field of Search ............ 308/173, 188, 189 R, 308/189 A, 198, 197, 195; 51/291, 101 R, 97 NC; 29/148.4 R

[56] References Cited

U.S. PATENT DOCUMENTS

| | | | |
|---|---|---|---|
| 1,334,027 | 3/1920 | Forsberg | 308/189 R |
| 2,266,175 | 12/1941 | Delaval-Crow | 308/198 X |
| 2,530,660 | 11/1950 | Hoeffleur | 308/198 |
| 2,983,560 | 5/1961 | Pitner | 29/148.4 R |
| 3,039,213 | 6/1962 | Allin | 308/198 X |
| 3,370,899 | 2/1968 | Eklund | 308/193 |

FOREIGN PATENT DOCUMENTS 1067265 10/1959 Fed. Rep. of Germany.
1401983 10/1965 France.

*Primary Examiner*—Stuart S. Levy
*Assistant Examiner*—Thomas R. Hannon
*Attorney, Agent, or Firm*—Wenderoth, Lind & Ponack

[57] ABSTRACT

On the periphery of the ball bearing, six regions alternately ensure upon assembly of the bearing a pre-stressing of the balls in each direction, and six unloaded regions separate these bearing regions. In this way, the bearing is rendered rigid as concerns a tilting moment and there is a low rate of sliding of the balls and it is possible to assemble the bearing by disposing the two rings and the cage coaxially and then inserting the balls one by one through a radial aperture formed in one of the rings and opening onto an unloaded region. Application in the mounting of automobile vehicle wheels.

13 Claims, 11 Drawing Figures

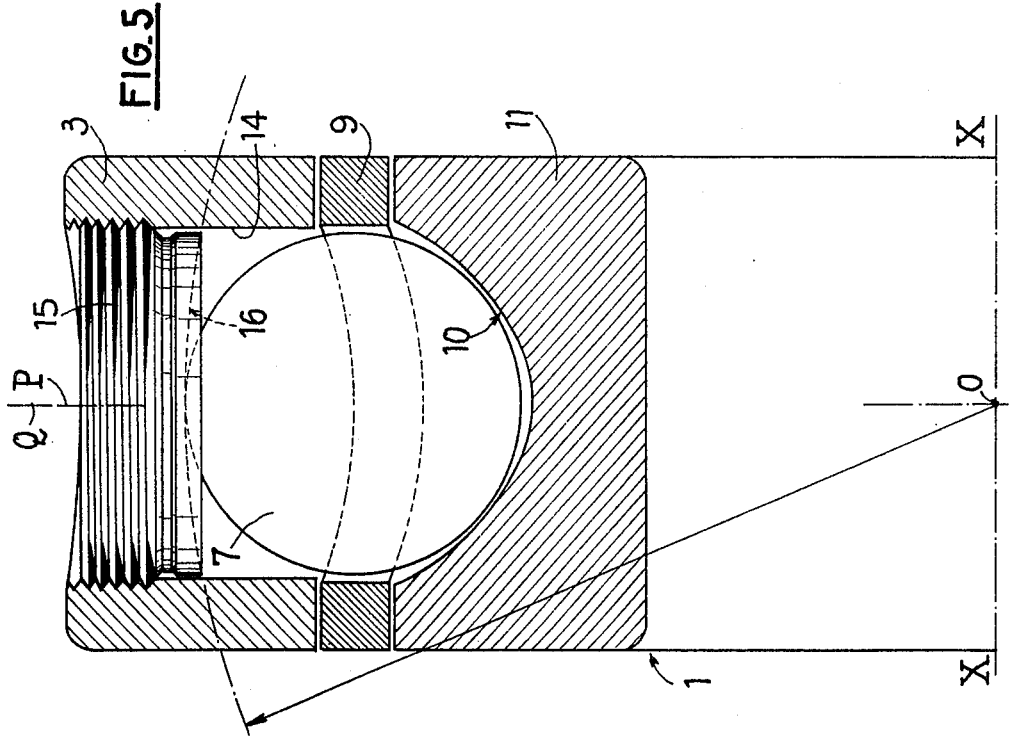
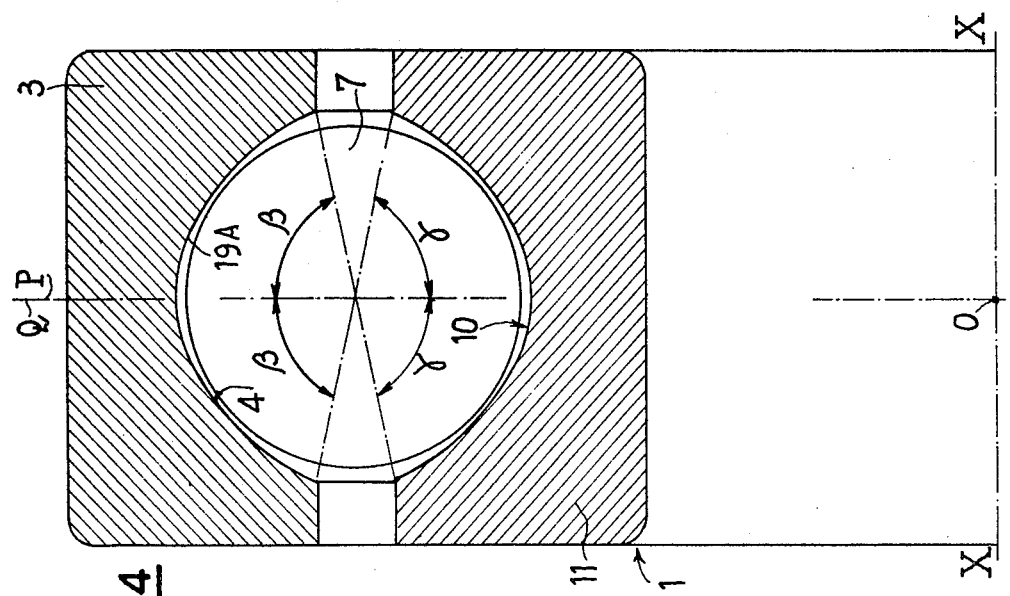

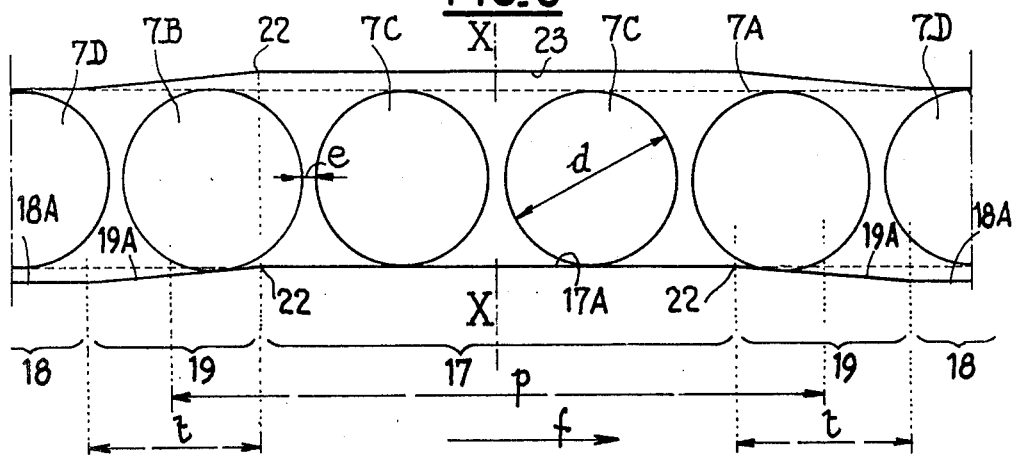
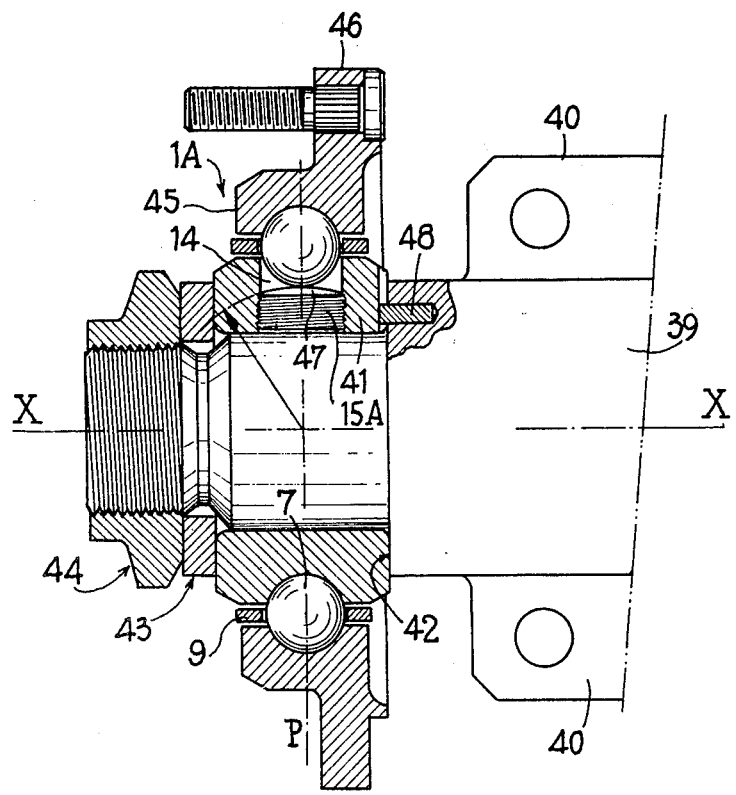

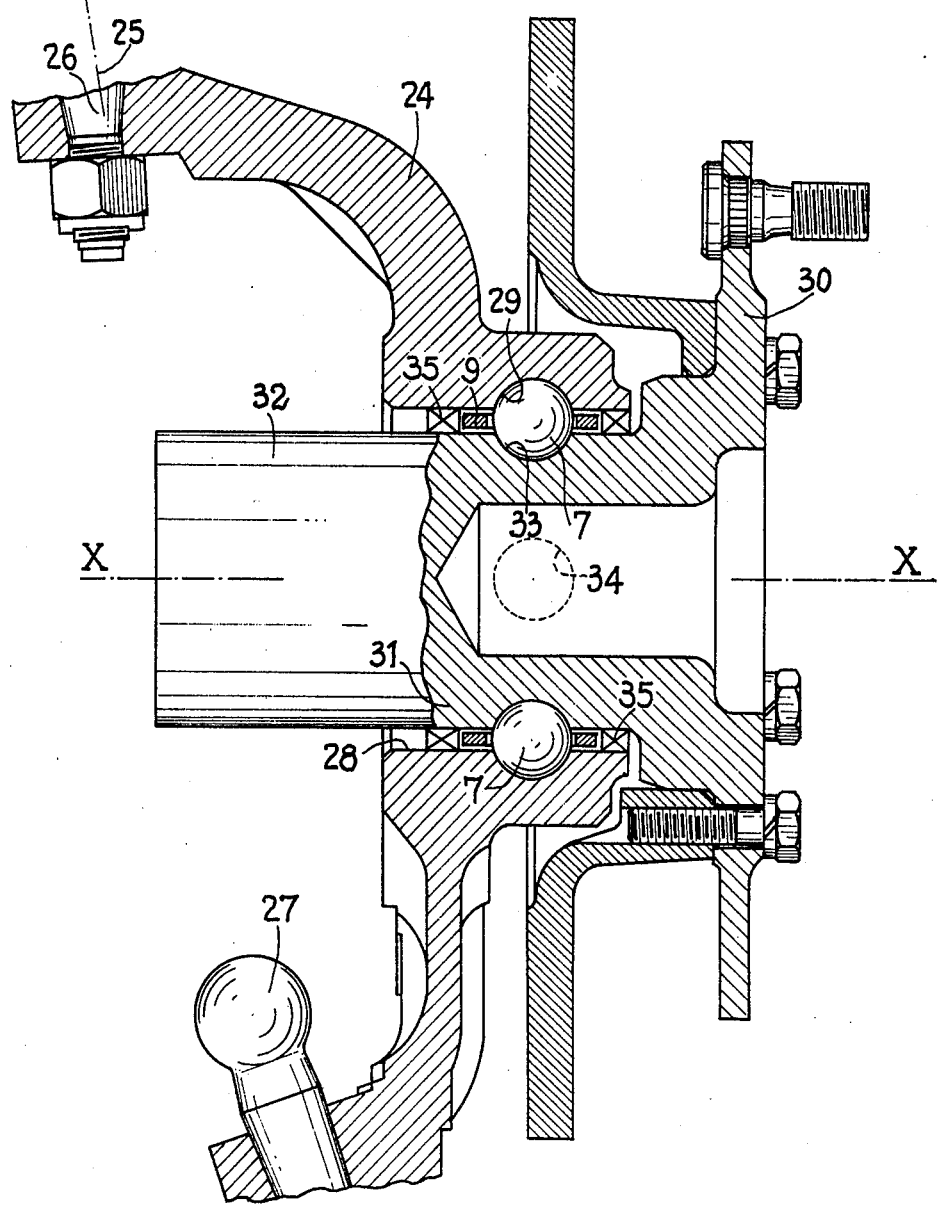

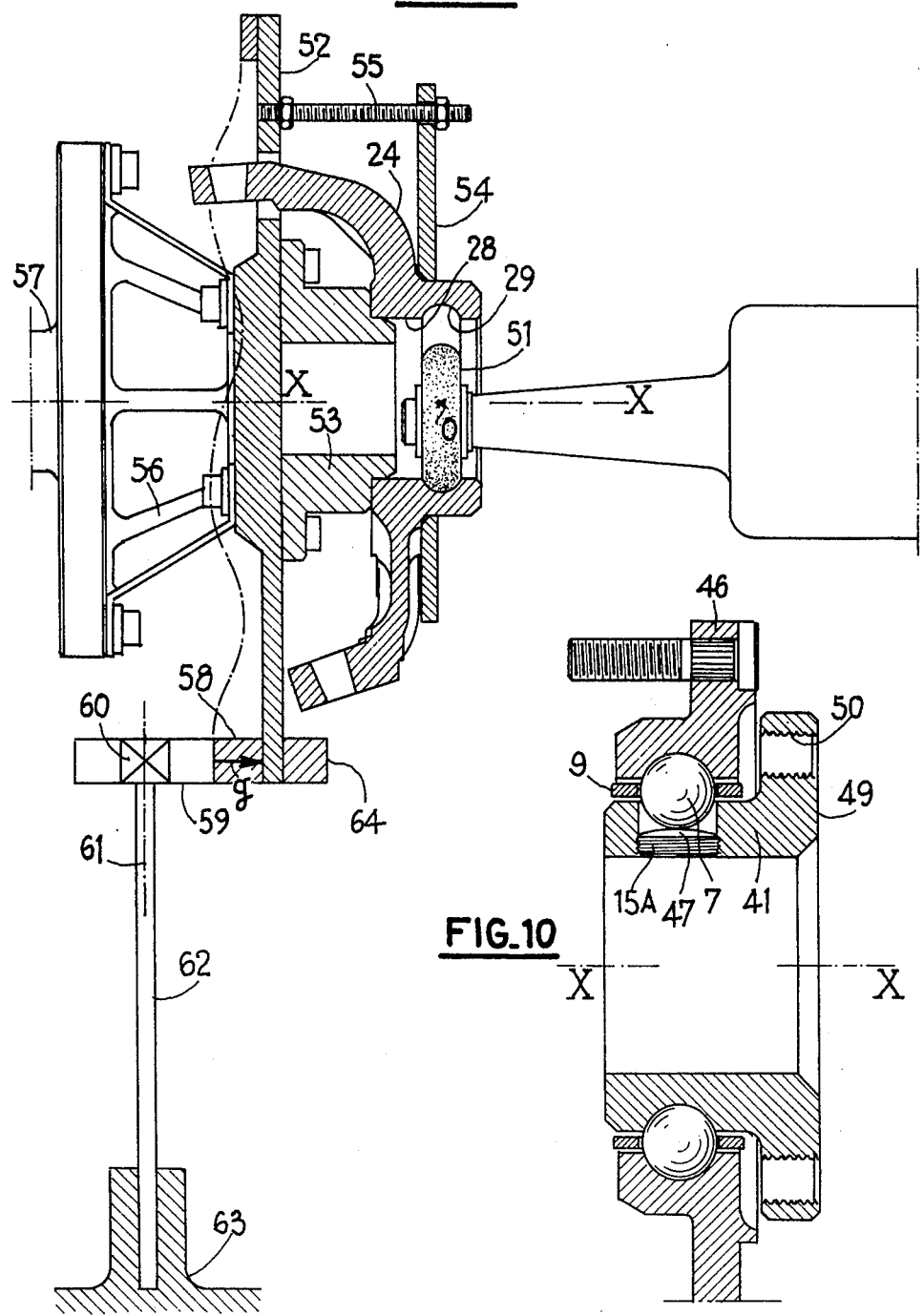

BALL BEARING METHOD FOR ASSEMBLING THE BEARING AND AN APPARATUS FOR GRINDING THE BEARING

DESCRIPTION

The present invention relates to ball bearings of the type having a single row of balls and assembled with a pre-stressing of the balls.

Ball bearings of this type have coaxial tracks or raceways and a perfect symmetry of revolution about the axis of the bearing. Consequently, the pre-stressing of the balls is uniform.

This design has serious drawbacks related to the manner of assembling this type of rolling bearing. Indeed, in order to permit this assembly, it is necessary both to reduce the number of balls and the enveloping angle of the tracks and to employ a cage having cavities open on one side, of the "comb" type, or in two parts riveted together and having very wide separators. The load transferring capacity of the bearing is consequently correspondingly reduced.

An object of the invention is to provide a rolling bearing which may have a considerably increased load transferring capacity for identical dimensions and material.

Consequently, the invention provides a ball bearing of the aforementioned type, wherein, in a localized sector of the periphery of the bearing comprising a region which is completely unloaded and bordered by two progressive loading and unloading regions, the tracks are ground in such manner as to be capable of receiving in the completely unloaded region a ball without pre-stressing or with a slight clearance in the bearing as assembled and in normal operation.

Indeed, it is then possible to provide such a bearing with a much larger number of balls by providing an aperture which extends through a ring of the bearing and opens onto the completely unloaded region, and a detachable plug for said aperture, and by assembling the bearing in the following manner: disposing the two rings and the cage concentrically; bringing a cavity of the cage in confronting relation to the aperture; introducing a ball in said cavity through said aperture and turning one ring with respect to the other until the following cavity of the cage is brought into confronting relation to the aperture; introducing a second ball in said cavity through the aperture, and so on until the cage is filled with balls; and placing the plug in the aperture. Owing to the fact that the aperture opens onto a region which remains completely unloaded in normal operation of the bearing, the presence of said aperture results in no jumping of the balls, no particular wear and no noise.

Further, the existence of an unloaded region is not disadvantageous in many applications in which the loads exerted on the bearing have mainly one or more well-determined directions, which is the case of vehicle wheel bearings, provided of course that this region is judiciously positioned with respect to these loads.

The unloaded region may be obtained by a localized off-setting of a track of the bearing, it being possible to cyclically repeat this offsetting on the circumference of the bearing.

The bearing according to the invention has another important advantage. It is known that, in order to avoid friction of an unacceptable level in the bearings, the bearing tracks are ground at a radius which is slightly larger than the radius of the balls (conformity ratio: $r/R=0.94$ for example). Consequently, when the bearing is subjected to a moment perpendicular to its axis, for example to a tilting moment in the case of a bearing for an automobile vehicle wheel, the points of contact between the balls and the tracks are axially shifted so that one ring angularly deviates with respect to the other ring about the axis of the moment. The guiding is consequently unprecise.

When a very precise directional guiding is desired for a rotating part through a single ball bearing, the technique of of the single row of balls is consequently not possible with conventional rolling bearings, since, by construction, they allow a substantial oscillation under the effect of the tilting moment. Means for ensuring rigidity in tilting is well known, namely in providing two regions of contact per ring on each ball owing, for example, to an ogival contour of the raceways, but this technique results in a high degree of friction and consequently in unacceptable heating and wear.

On the other hand, in a bearing according to the invention comprising a fixed ring and adapted to be subjected to a moment of predetermined direction perpendicular to its axis, there may be provided, in the free state of the bearing, at least one unloaded region on each side of the diameter perpendicular to said moment and, at each end of this diameter, a bearing region which creates upon assembly a pre-stressing having an axial component in the direction opposed to that of the moment. The bearing is then perfectly rigid as concerns the considered moment and operates substantially without sliding.

If the moment can be exerted in two opposite directions, which is the case of the tilting moment acting on a vehicle wheel, the optimum solution consists in providing three bearing regions in each direction, which are alternate or separated by six unloaded regions of transition, these twelve regions being evenly spaced apart on the periphery of the bearing.

If, moreover, the moment can assume a much higher value in one direction than in the other, it is desirable that the bearing regions located at the ends of the diameter perpendicular to this moment each create upon assembly a pre-stressing whose axial component is directed in the direction of the moment of highest value.

Another object of the invention is to provide an apparatus for grinding a ball bearing having alternating unloaded regions and bearing regions. Said apparatus, which is of the type comprising a grinding wheel, a rotary spindle driven by a motor, a work holding table perpendicular to the axis of the spindle, elastically yieldable connecting means between the table and the spindle, means for biasing the table in a variable manner in the course of its rotation, at least in a direction parallel to this axis, and means for maintaining a rolling bearing ring coaxially with the table, ie. of the type described in French Pat. No. 1 401 983, this apparatus having the feature that the elastically yieldable connecting means are adapted to ensure a rotation of the ring about a fixed axis which passes substantially through its centre under the effect of said biasing means.

The invention will be described hereinafter in more detail which reference to the accompanying drawings which show only some embodiments of the invention. In the drawings.

Figure 1:
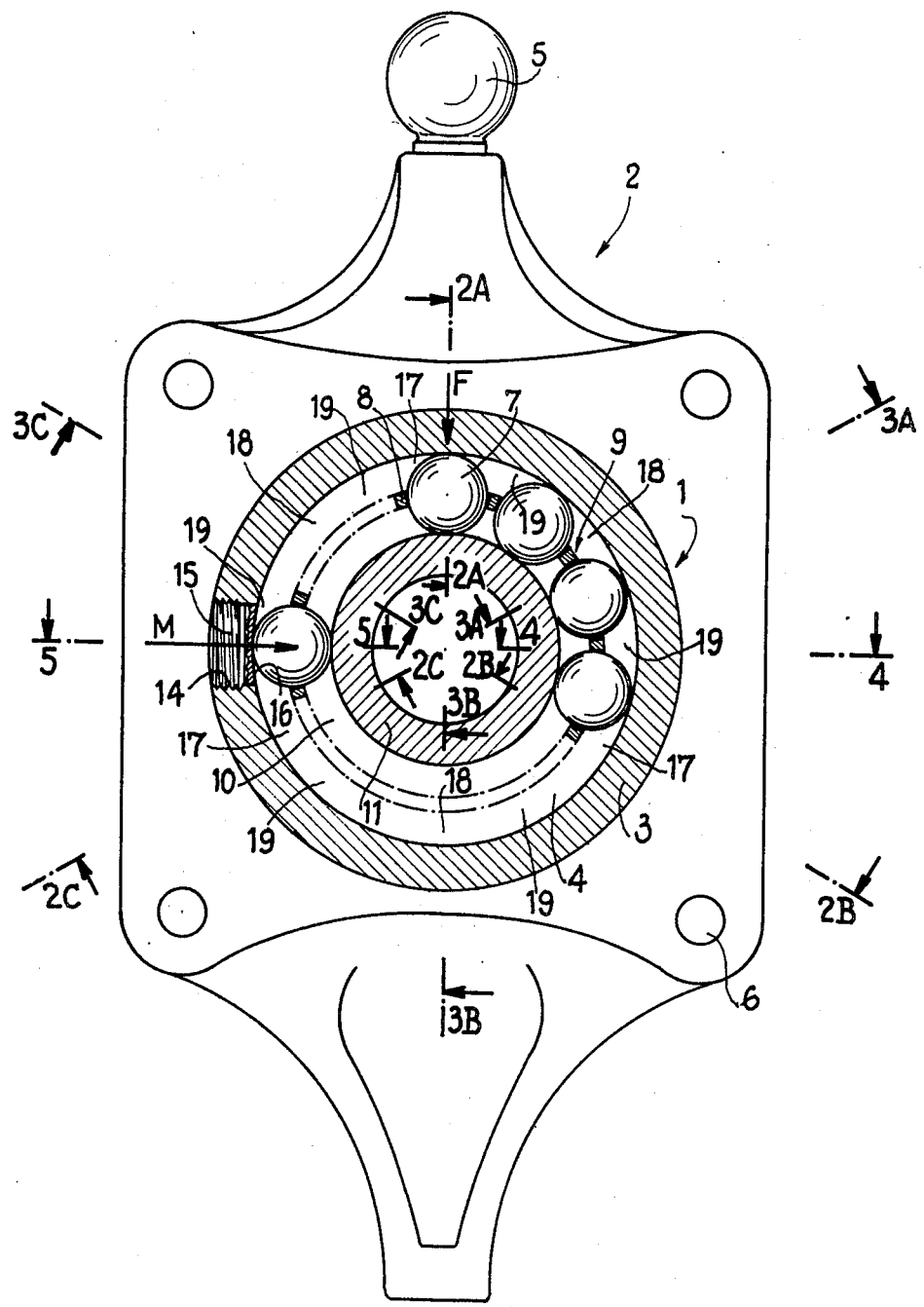
FIG. 1 is a sectional view of a ball bearing according to the invention taken in its plane of symmetry perpendicular to its axis.
Figure 2:
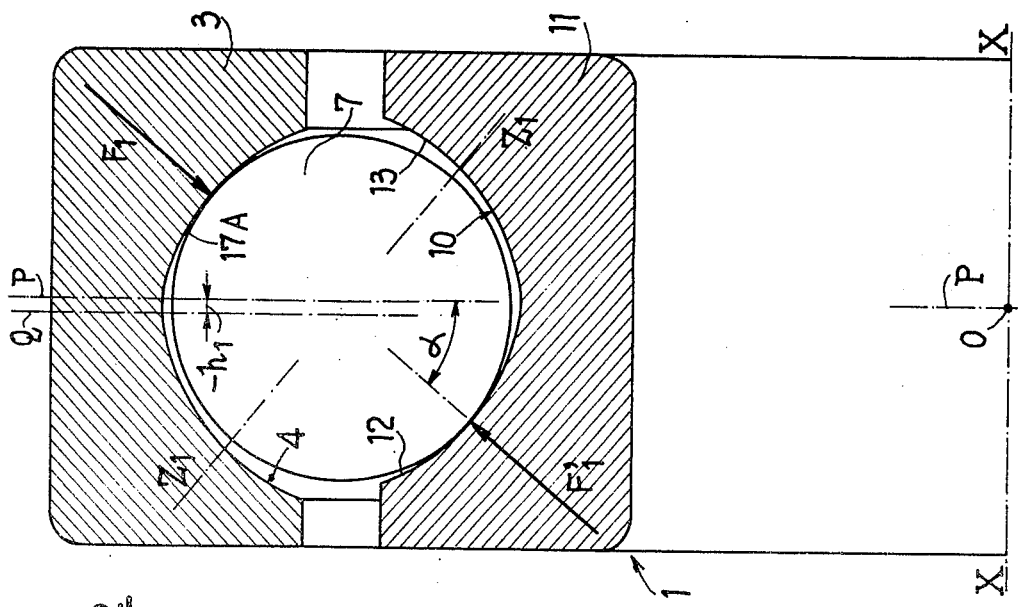
FIG. 2 is a sectional detail view to an enlarged scale taken on any of the lines 2A—2A, 2B—2B and 2C—2C of FIG. 1.

FIGS. 4 and 5 are sectional detail views similar to FIG. 2 taken respectively on lines 4—4 and 5—5 of FIG. 1;

FIG. 6 is a diagrammatic developed view of the bearing;

FIGS. 7 to 10 are axial sectional views illustrating two applications of the bearing according to the invention, and FIG. 11 is a diagrammatic axial sectional view of an apparatus for grinding a rolling bearing according to the invention.

FIGS. 1 to 5 show a ball bearing 1 which is incorporated in a pivot body 2 of a front driving wheel of an automobile vehicle. The outer ring 3 of the bearing is fitted and blocked in the pivot body 2 in accordance with a known method. It carries the outer bearing track 4. FIG. 1 shows one of the two spherical balls 5 carried by the body 2 and apertures 6 in the latter for fixing a brake shoe and a steering finger member (not shown).

The bearing 1 also comprises balls 7 which are separated by bars 8 of a cage 9 and roll on the raceway or track 10 of the rotating inner ring 11, on which is held fast, in the known manner, the stub-axle of a homokinetic driving joint and a wheel-carrying flange (not shown). The inner raceway or track 10 is ground to a revolution about the axis X—X of the bearing and its meridian contour may advantageously comprise, as shown in FIGS. 2 to 5, two arcs of a circumference 12 and 13 whose radius exceeds the radius of the balls and which intersect in an ogival shape in the plane P of FIG. 1 so that a checking ball freely placed on this track 10 has two points of contact oriented at angles α advantageously between 25° and 45° (FIG. 2).

The non-rotating track 4, which is the outer track in this embodiment, also has a meridian contour preferably formed by two arcs of a circumference arranged as an ogive so that a checking ball freely placed inside this track has therein two points of contact located on each side of the plane of symmetry P at the same angle α as before. However, the line of symmetry Q of the half-section of this track 4 is alternately axially offset in both directions with respect to the plane P.

More precisely, in the upper vertical section 2A—2A and in each section 2B—2B and 2C—2C located respectively at 120° and 240° from the latter, the line Q is offset in a first direction (toward the left as viewed in FIGS. 2 to 5) by an extent $-h_1$ of the order of 0.01 to 0.05 mm. Consequently, when no load is applied to the inner ring 3, a pre-stressing force $F_1$ making the aforementioned angle α with the plane of symmetry P of the bearing, is transferred by the ball from the outer race 4 to the inner race 10, whose reaction is $F'_1 = -F_1$. Further, in this region, the balls 7 rotate about an axis $Z_1-Z_1$ which is substantially perpendicular to $F_1$ during the rotation of the ring 11 of the bearing, with a single point of contact on each track and, consequently, a substantially pure rolling operation.

Figure 3:
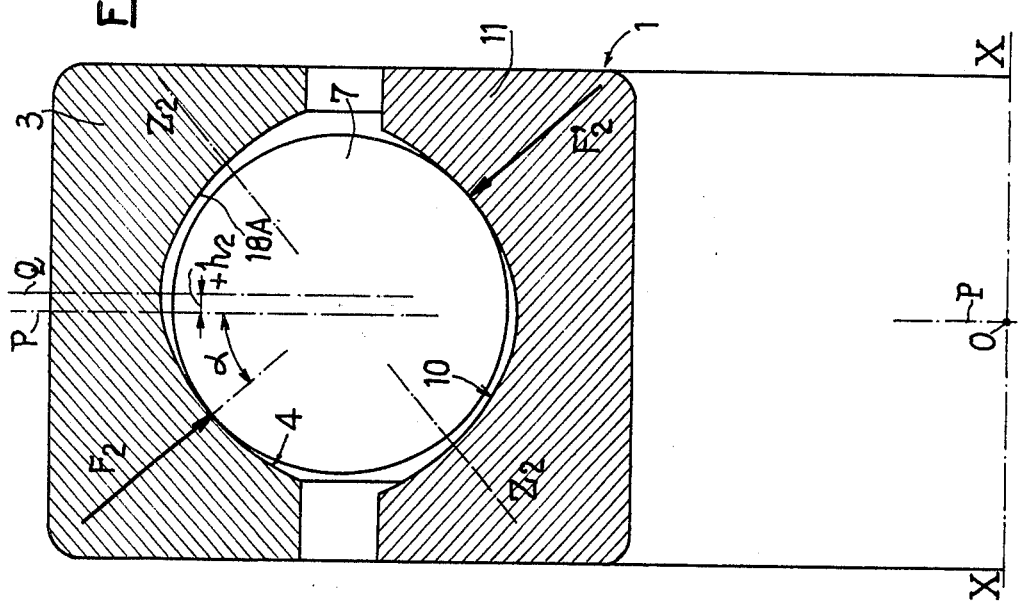
FIG. 3 is a sectional detail view similar to FIG. 2 taken on any one of the lines 3A—3A, 3B—3B and 3C—3C of FIG. 1.

FIG. 3 shows diagrammatically the position of the balls in the section 3A—3A of FIG. 1, which makes an angle of about 60° with the section 2A—2A or in one of the sections 3B—3B and 3C—3C located respectively at 120° and 240° from the section 3A—3A. In these sections, the axis of symmetry Q of the section of the fixed outer race 4 is offset from the plane P in the direction opposed to the preceeding embodiment, ie. toward the right as viewed in FIGS. 2 to 5, by an extent $+h_2$ of the order of 0.01 to 0.05. Consequently, when no load is applied to the inner ring, a pre-stressing force $F_2$, making with the plane of symmetry P the aforementioned angle α, is transferred by this ball from the outer track 4 to the inner track 10, whoes reaction is $F'_2 = -F_2$. Further, the ball rotates in this region about an axis $Z_2-Z_2$ which is substantially perpendicular to $F_2$ during the operation of the bearing, with a single point of contact on each track, which is consequently a substantially pure rolling contact.

FIG. 4 shows a diagrammatically two tracks and a ball in the region of the section 4—4 located at 90° with respect to the section 2A—2A and consequently at 30° with respect to the sections 3A—3A and 2B—2B. In this section 4—4, the sections of the two tracks have their axes of symmetry coincident in the plane P: $h_3=0$. The dimensioning is such that the ball takes substantially no load from the track and there may even be a slight clearance of the order of 0.05 to 0.1 mm. The same is true in the five other sections located at 60°, 120°, 180°, 240° and 300° with respect to the section 4—4.

In one of these six sections, for example in the section 5—5 located at 120° with respect to the section 4—4 and shown in FIG. 5, an aperture 14 provided with a detachable plug 15 opens onto the cavity of the bearings so as to permit the insertion of the balls between the tracks of the two bearing rings. The plug 15 has a spherical concave inner end 16 centered on the centre 0 of the bearing, which permits the outer guiding of the balls, in cooperation with the track of the inner ring and with the cage 9, in this region where the balls are completely unloaded. The plug 15 is screwed into the aperture 14 so that it is possible to adjust with precision the radial position of the concave guiding surface 16. Owing to the shape of this surface 16, the angular position of the plug 15 in the aperture 14 is uncritical and the surface 16 provides the continuity of the median line of the outer track 10 as soon as its radial position is correct.

The bearing 1 (FIG. 1) thus has three bearing regions or sectors 17 in one direction, on each side of the sections 2A—2A, 2B—2B and 2C—2C, three bearing regions or sectors 18 in the other direction, alternating with the preceding regions and located on each side of the sections 3A—3A, 3B—3B and 3C—3C, and six short transition regions or sectors 19 which are roughly at 30°, 90°, 150°, 210°, 270° and 330° from the upper section 2A—2A. These transition regions enable the balls 7 to change their axis of rotation when passing from one pre-stressed region to the following.

The partial development of the upper part of the bearing, seen in a vertical direction perpendicular to the axis X—X, is illustrated in FIG. 6, in which the track of the fixed ring is shown in full lines and the track of the rotating ring in dotted lines. In order to render the diagram more clear, the points of contact with the balls are shown as if they occurred in the plane of the Figure and the non-rectilinear shape of the track of the fixed ring is very exaggerated. It will also be understood that the undulation or warp of the race 4 is very much exaggerated in order to provide a clear representation. Further, in practice, the transitions between the regions 17, 18 and 19 are progressive.

When considering an edge portion of the bearing, there is found on each side of the section 2A—2A of FIG. 1, a bearing land or plateau 17A of length l extending throughout the region 17 and, on each side of the land, loading and unloading ramps 19A whose middle corresponds to sections such as the section 4—4 of FIG. 1. These ramps 19A have a length t and extend in the two regions 19 adjacent to the considered region 17 and their ends opposed to this region 17 are connected to two unloaded lands or plateaus 18A against which the balls do not bear and which extend in the two adjacent regions 18. The configuration of the other edge portion is opposed to that just described and the whole arrangement is cylically reproduced on the periphery of the bearing.

Assuming that the rotating ring of the bearing rotates in the direction f (toward the right as viewed in FIG. 6), there has been diagrammatically represented in FIG. 6 a ball 7A and a ball 7B at the moment of an unloading of the ball 7A to an extent of 50% and a loading of the ball 7B to the extent of 50% with respect to the substantially constant load on the balls 7C rolling on the land 17A between its two ends 22. These balls 7A and 7B are at this instant approximately at a quarter of the length t from the end 22 of the bearing land 17A.

In order to limit the loss of capacity of the bearing due to the transition regions 19, the latter must have a short length. Further, the pitch $p=l+t$ of the bearing lands, such as 17A, and the length t of the ramps 19A are so chosen with respect to the diameter d and the number N of the balls 7 that the unloading period of a ball coincides with the loading period of another ball so that the overall thrust of the balls rolling along a given land is substantially constant and insensitive to the loading and unloading phases.

If e designates the space between two balls, defined by the cage 9, it is possible to establish simply, for the considered case, the following relation:

$$p = k(d+e) + t/2 \quad (1)$$

in which k represents the number of balls under load on a land.

If it is assumed that there are $3+3=6$ lands of pitch p, the total number of balls can be expressed as:

$$N = 6p/(d+e) \quad (2)$$

Thus, by using the relation (1):

$$N = [6k(d+e) + 3t]/(d+e) = 6k + 3t/(d+e) \quad (3)$$

The expression $(d+e)$ represents the centre-to-centre distance of two consecutive balls.

If the number of balls k per land is taken to be equal to 3, as shown in FIG. 6, the following table can be drawn up which gives the whole number values of N as a function of the ratio $t/(d+e)$.

| $\frac{t}{(d+e)}$ | 0 | 1/3 | 2/3 | 1 | 4/3 |
|---|---|---|---|---|---|
| N | 18 | 19 | 20 | 21 | 11 |

By way of a modification, it is possible, by modifying the developed shape of the ramps 19A with respect to the rectilinear shape of FIG. 7, to obtain the 50% unloading and loading of the balls at a distance t/8 from the ends 22 of the bearing lands, for example, instead of at a distance t/4. The relations (1) and (3) then become:

$$p = k(d+e) + \frac{3}{4} t \quad \text{(1 bis)}$$

and $$N_{bis} = \frac{6k(d+e) + \frac{9}{2} t}{(d+e)} = 6k + \frac{9}{2} \frac{t}{(d+e)} \quad \text{(3 bis)}$$

The following table can in this case be drawn up:

| $\frac{t}{(d+e)}$ | 0 | 2/9 | 4/9 | 2/3 | 8/9 | 10/9 | 4/3 |
|---|---|---|---|---|---|---|---|
| N | 18 | 19 | 20 | 21 | 22 | 23 | 24 |

The bearing 1 can be assembled in the following manner:

The inner ring 11 and the cage 9 are inserted in the outer ring 3 without difficulty. The plug 15 is withdrawn. The cage 9 is set in position so as to present a cavity in front of the ball supply aperture 14. A ball can then be inserted between the tracks and then, by rotating the inner ring 11, the inserted ball is made to roll and the cage to turn until the latter has its following cavity in front of the ball supply aperture 14, and so on until all the balls have been inserted.

It will be understood that the balls are easy to insert since, in the supply section 5—5, no pre-loading is exerted on the balls. On the other hand, when the balls, after rolling, reach the sections corresponding to the regions 17 and 18, they are pre-loaded; in this way there is very easily established a pre-stressing at the desired value which depends solely on the constructional dimensions of the tracks and the dimension of the balls, which are usually classified to within 2 microns.

In operation, the bearing 1 is subjected mainly to a vertical load F passing through its centre 0 and to a horizontal tilting moment M passing also through the point 0. Owing to the configuration described above of the fixed track or raceway, the bearing is perfectly rigid not only in respect of the load F but also in respect of the moment M. Indeed, assuming that this moment occurs from the left to the right as viewed in FIG. 1, it tends to displace the ball located in the section 2A—2A in the direction which increases the stress thereon, and the same is true of the ball located in the diametrally opposed section. The inner ring 11 consequently undergoes no rotation with respect to the outer ring 3 about the moment M.

When the moment M is exerted in the opposite direction, the two upper and lower bearing lands or plateaus are unloaded, but it is the four other bearing lands which prevent any relative rotation of the two rings of the bearing.

Further, it is known that when the rim of the wheel of a vehicle laterally strikes against a curb of a pavement, a very high tilting moment is applied to the bearing. It is then possible to advantageously distribute this exceptional overload among a larger number of balls in setting the fixed ring 3 in such manner that the upper and lower sections are unloaded under the effect of this high moment. It would therefore be desirable that the exterior of the wheel be located on the left as viewed in FIG. 2, the peak moment being opposed to the moment M shown in FIG. 1.

In this way, in the upper region of the bearing, when an accidental lateral blow occurs, the balls 7A and 7B and the two balls 7C located therebetween exceptionally come into contact on the edge portion 23 opposed to their normal contact and thus relieve the balls, such as the two end balls 7B of FIG. 6, of a part of an instantaneous overload. The same advantageous phenomena occur of course in the lower region of the bearing and, to a lesser extent, in the intermediate regions.

Consequently, the risk of a localized initiation of the fracture of the bearing upon a blow against a curb of a pavement is considerably reduced.

Note also that the bearing 1 operates with an almost pure rolling of the balls, ie. with the minimum of heating and wear under load. Further, it has considerable strength under the effect of the stresses with radial and axial loads and as concerns the tilting moment, owing to the large enveloping design of the tracks or raceways. Indeed, the cage may be a simple thin ring having closed cavities and, owing to the manner of assembling the bearing described hereinbefore, the tracks may have a large enveloping angle $2\beta$ and $2\gamma$, of the order of for example 150° (FIG. 4).

In respect of a bearing which is subjected to alternating moments, at least three bearing regions in each direction must be provided. As the increase in the number of these lands or plateaus would result in a decrease in the capacity of the bearing, and in an increased number of changes in the axis of rotation of the balls owing to the increase in the number of transition regions 19, it is preferred to limit this number to three. However, it will be understood that, in other applications where a single direction of moment is to be considered, two regions 17 and two regions 18 would be sufficient.

Further, in the embodiment described hereinbefore, the balls are unloaded by a purely axial displacement of the fixed track. By way of a modification, this displacement could comprise a radial component or even, if the bearing is subjected solely to a radial load such as F, be purely radial, the unloading region being then a single region located at the point diametrally opposed to this load.

Figure 8:
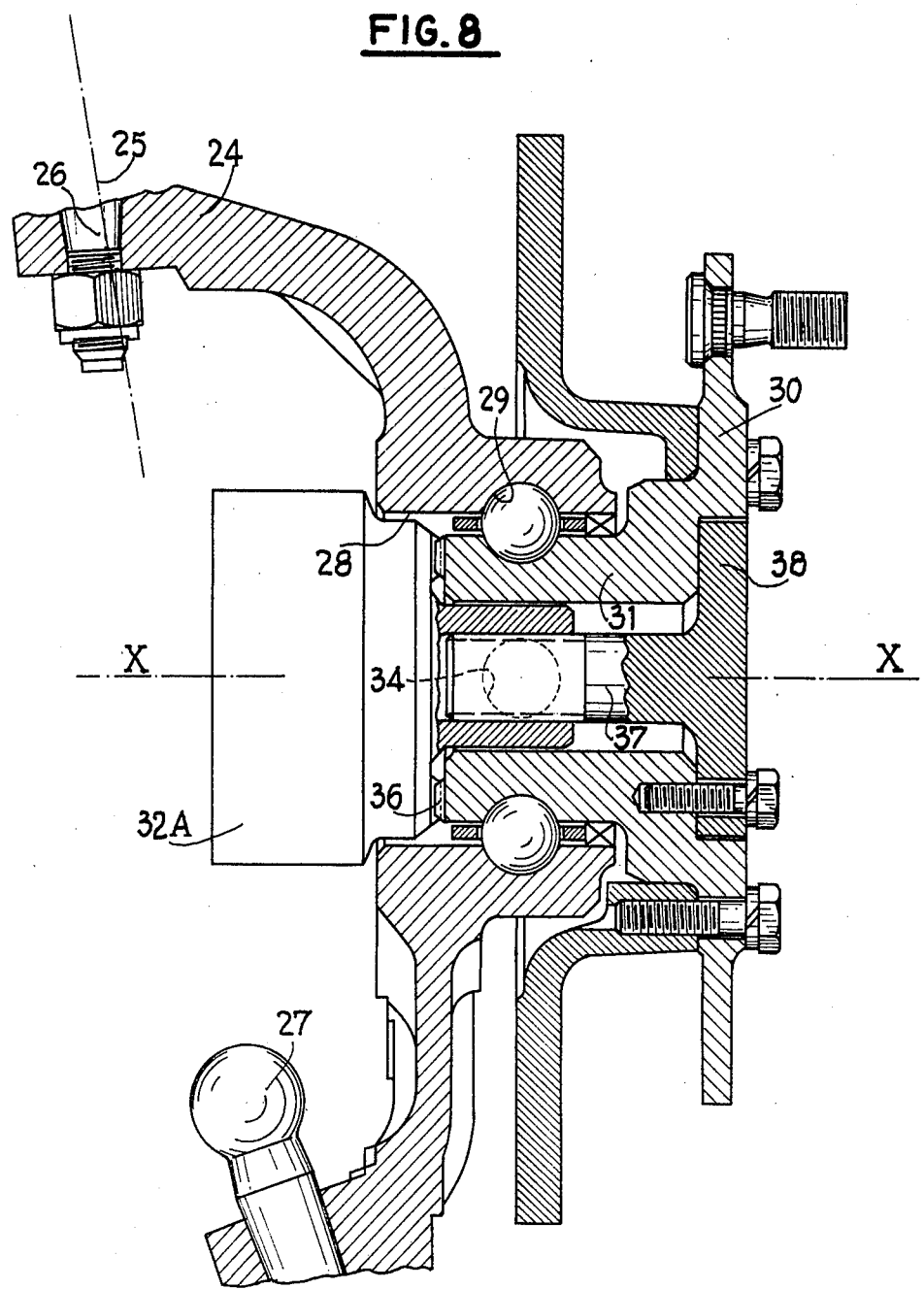

FIGS. 7 and 8 show two front driving wheel hub-pivot assemblies incorporating a ball bearing such as the bearing 1. The pivot proper 24 is mounted to pivot about an axis 25 by means of two ball joint balls 26 and 27. The bore 28 of this pivot carries a groove or track 29 which is treated in such manner as to have a high surface hardness and ground with a cyclic axial offset as described hereinbefore in respect of the fixed ring 4 of the bearing 1. In the embodiment shown in FIG. 7, the wheel carrying flange 30 has an axial extension 31 which extends through the bore 28 and is rigid with a homokinetic driving joint 32 on the inner side of this bore. Provided on the periphery of the extension 31 is a ground raceway or track 33 which is of perfect revolution, as is the rotating ring 11 of the bearing 1, after hardening in depth or case hardening. The balls 7 are inserted by way of a radial aperture 34 in the pivot 24 and are held spaced apart by the bars of the cage 9. Sealing elements 35 are disposed on each side of this cage.

In the modification shown in FIG. 8, a homokinetic joint 32A is coupled coaxially with the extension 31 of the flange 38 by confronting teeth 36, the axial blocking thereof being achieved by means of a tie bar 37 screwed in the outer end of the homokinetic joint and having on the outside a flange 38 which is applied against the outer face of the flange 30.

Whereas in the embodiments shown in FIGS. 1 to 8 it is the outer ring which is fixed with respect to the main radial load and to the tilting moment, FIGS. 9 and 10 show applications of the invention in which it is the inner ring which is fixed with respect to these main forces applied to the bearing. It is therefore, in respect of these FIGS. 9 and 10, the inner ring track which is "warped" cyclically as described hereinbefore. These applications concern freely rotatable or merely supporting wheels, such as the wheels of trailor axles or the rear wheels of front wheel drive vehicles.

In FIG. 9, the axle 39 which comprises radial fixing flanges 40 receives at the end the inner ring 41 of the rolling bearing 1A, which is blocked between a shoulder 42 of the axle and a washer 43 clamped in position by a nut 44. The outer ring 45 which carries a wheel fixing flange 46 has a track or raceway perfectly of revolution. The aperture 14 for inserting the balls 7 is formed radially in the inner ring 41 and the plug 15A of the aperture 14 has a convex spherical outer end surface 47 whose centre of curvature is located on the axis of rotation X—X and in the plane of symmetry P of the track. This convex curved shape permits, in the same way as the concave shape of the surface 16 shown in FIGS. 1 to 8, ensuring the continuity of the mean line of the inner track by a simple correct radial positioning of the plug 15A. A pin 48 insetted in the axle 39 permits ensuring the correct setting of the fixed ring relative to the radial load and to the tilting moment upon assembly of the bearing. The cage 9 and sealing elements (not shown) complete this bearing.

The modification shown in FIG. 10 differs from the preceding modification only in that the inner ring 41 is rigid with a flange 49 which is provided with peripheral tapped apertures 50 for fixing it to the body of a vehicle. There is shown again the plug 15A having the curved convex surface for supplying the ring arrangement of balls and the cage 9 and the wheel carrying flange 46.

In each embodiment of the ball bearing according to the invention, an ogival cross-sectional contour has been shown for the tracks or raceways. By way of a modification, this contour may be of other shapes, for example an elliptical or substantially elliptical shape or a circular shape having a radius slightly larger than the radius of the balls. However, the ogival or elliptical shapes are preferred in the present invention since they permit obtaining the rigidity of the bearing as concerns the tilting moment at the price of a much smaller cyclic displacement of the plane of symmetry of the fixed rolling groove.

FIG. 11 shows diagramatically an apparatus for grinding the track of the fixed ring according to the invention, which is assumed to be applied to one of the arrangements shown in FIGS. 7 and 8. The fixed track or raceway 29 of the pivot 24, previously rough-shaped, of revolution in the bore 28 and case hardened, is ground with the precise shape described hereinbefore, ie. with a section of constant contour which is axially displaced cyclically with respect to a vertical plane of reference. The grinding wheel 51 which is contained in this vertical plane of reference is driven solely with a radial movement of approach and work and a movement of rotation about its own axis. The workpiece carrying platen 52 which is parallel to the plane of reference and rotates at a speed of 60 to 200 rpm, carries a ring 53 for centering the pivot and a device for clamping the latter shown diagrammatically by a plate 54 parallel to the table and connected to the latter by peripheral tie-rods 55. The workpiece carrying platen 52 is connected to the workpiece carrying spindle 57 of the grinding machine-which is driven by a motor (not shown)-through a series of flexible strips 56 which are evenly spaced apart circumferentially. These strips 56 are oriented so that they converge substantially at the centre 0 of the groove 29 to be ground.

The workpiece carrying platen 52 carries an axial cam 58 on its periphery against which cam rolls in continuous contact therewith a roller 59 which is journalled by a ball bearing 60 on a roughly vertical shaft 61 of a flexible arm 62 which has an adjustable effective length and an opposite end portion which is maintained firmly on the frame 63 of the grinding machine. The arm 62 has high flexibility and the strips 56 have a much lower flexibility. A balancing weight 64 is disposed on the workpiece carrying platen 52 so as to eliminate the out of balance of the assembly comprising the workpiece carrier, the pivot to be ground and the clamping device.

This apparatus operates in the following manner:

During the rotation of the platen 52, the cam 58 receives from the roller 59 an axial thrust in the direction of arrow g the magnitude of which is proportional to the height of the cam 58. Owing to the flexibility of the strips 56, the platen 52 very slightly oscillates about the centre 0 and reproduces on a very small scale the modulations of the cam, the ratio between the displacements of the roller 59 and the adjacent point of the platen 52 being defined by the ratio between the elasticities of the arms 62 and the strips 56.

For example, there may be employed a reducing ratio of 1/500 between the cam 58 and the groove 29, in which case a drop in the level of 5 mm of the cam 58 produces a rotation about 0 corresponding to an offsetting of the groove 29 to be ground of $5 \times 1/500 = 0.01$ mm namely 10 microns. The offsetting of the groove 29 thus reproduces with fidelity the contour of the cam 58 and this reduction is without an internal force of friction or inertia and therefore has all the desired properties of precision and fidelity.

It will be understood that in the embodiments shown in FIGS. 9 and 10, the track or raceway of the fixed inner ring may be ground by means of a grinding set-up which is termed an outer set-up. The principle of modulation of the axial position of the groove in this set-up would be similar to that of FIG. 11 with an adaptation of the apparatus which will be obvious to one skilled in the art.

By way of a modification, the strips 26 may be replaced by flexible pillars oriented in the same manner and for example three in number, or by any other connecting device capable of rotating the pivot about a fixed axis which passes rourhgly through the point 0 under the effect of the roller 59.

If it is desired to impart a radial component to the displacement of the fixed track section, it is sufficient to apply the teaching of French Pat. No. 1 401 983 relating to this case.

Having now described my invention what I claim as new and desire to secure by Letters Patent is:

1. In a ball bearing having an axis of rotation and comprising two bearing rings defining ball tracks, and a single row of balls interposed between the tracks, said tracks each having a cross-sectional concave, curvilinear contour which envelopes each ball sufficiently to ensure contact between the ball and the track in bearing operation, each track contour having a side portion on each side of the ball which is flatter than the curvature of the ball surface; the improvement wherein one of said rings is a fixed ring for subjection to a moment of given direction perpendicular to said axis of rotation, the track of the fixed ring being ground in such manner as to provide at least one unloaded region of the tracks on each side of a diameter perpendicular to said moment and, at each end of said diameter, a loaded ball region which creates, upon assembly of the bearing, a pre-stressing of the balls in said two loaded ball regions, which pre-stressing has an axial component in a direction opposed to the direction of said moment, said unloaded regions being interposed between two regions for respectively progressively loading and progressively unloading the balls, the fixed ring being adapted to receive a ball in one of said unloaded regions at least without a pre-stressing of the ball upon assembly of the bearing and in normal operation of the bearing.

2. In a ball bearing having an axis of rotation and comprising two bearing rings defining ball tracks, and a single row of balls interposed between the tracks, said tracks each having a cross-sectional concave, curvilinear contour which envelops each ball sufficiently to ensure contact between the ball and the track in bearing operation, each track contour having a side portion on each side of the ball which is flatter than the curvature of the ball surface; the improvement wherein one of said rings is a fixed ring for subjection to a moment of given direction perpendicular to said axis of rotation, the track of the fixed ring being ground in such manner as to provide at least one unloaded region of the tracks on each side of a diameter perpendicular to said moment and, at each end of said diameter, a loaded ball region which creates, upon assembly of the bearing, a pre-stressing of the balls in said two loaded ball regions, which pre-stressing has an axial component in a direction opposed to the direction of said moment, said unloaded regions being interposed between two regions for respectively progressively loading and progressively unloading the balls, the fixed ring being adapted to receive a ball in one of said unloaded regions with a clearance upon assembly of the bearing and in normal operation of the bearing.

3. A ball bearing according to claim 1, comprising an aperture provided with a detachable plug and extending through the fixed ring of the bearing, said aperture opening onto said unloaded region.

4. A ball bearing according to claim 3, wherein said aperture extends radially of the bearing and the plug is screwthreadedly engaged in the aperture and has a spherical inner surface centered on the centre of the fixed ring.

5. A ball bearing according to claim 1, wherein loaded and unloaded regions are obtained by a cyclic offsetting of the track of the fixed ring in a translation having an axial component.

6. A ball bearing according to claim 5, wherein the cyclic offsetting is substantially purely axial.

7. A ball bearing according to claim 1, wherein said moment is capable of being exerted in two opposite directions, the moment being capable of assuming a value which is much higher in one direction than in the other, and the loaded regions each create, upon assembly of the bearing, a pre-stressing having an axial component oriented in the direction of the moment of highest value.

8. In a ball bearing having an axis of rotation and comprising two bearing rings defining ball tracks, and a single row of balls interposed between the tracks; the improvement wherein one of said rings is a fixed ring for subjection to a moment of given direction perpendicular to said axis of rotation and capable of being exerted in two opposed directions, the tracks of the fixed ring being ground in such manner as to provide three ball loading regions on one side of said axis of rotation and pre-stressing the balls in one axial direction and three ball loading regions on an opposite side of said axis of rotation and pre-stressing the balls in an opposite axial direction for withstanding said moment capable of being exerted in two opposed directions, said six ball loading regions alternating with and being separated by six ball unloading transition regions in which the balls are non-pre-stressed, said twelve regions being evenly spaced apart around the periphery of the bearing, the fixed ring being adapted to receive a ball in one of said ball unloading regions.

9. In a ball bearing comprising two bearing rings defining ball tracks having an ogival cross-sectional contour, and a single row of balls interposed between the tracks and assembled with pre-stressing of the balls; the improvement wherein, in a localized sector of the periphery of the bearing comprising a completely unloaded ball region adjoining two regions for progressively loading and unloading the balls, the tracks of the bearing rings are ground in such manner as to be capable of receiving, in the completely unloaded region, a ball with a clearance upon assembly of the bearing and in normal operation of the bearing.

10. A ball bearing according to claim 9, comprising an aperture provided with a detachable plug and extending through a ring of the bearing, said aperture opening onto said completely unloaded region.

11. A ball bearing according to claim 10, wherein said aperture extends radially of the bearing and the plug is screwthreadedly engaged in the aperture and has a spherical inner surface centered on the centre of the corresponding ring of the bearing.

12. An apparatus for grinding a ball bearing comprising two bearing rings defining ball tracks and a single row of balls interposed between the tracks and assembled with pre-stressing of the balls, wherein, in a localized sector of the periphery of the bearing comprising a completely unloaded ball region adjoining two regions for progressively loading and unloading the balls, the tracks of the bearing rings are ground in such manner as to be capable of receiving, in the completely unloaded region, a ball at least without a pre-stressing of the ball upon assembly of the bearing and in normal operation of the bearing, a fixed ring of said rings being provided for subjection to a moment of a given direction perpendicular to the axis of rotation of the bearing and said bearing comprising, in a free state of the bearing, at least one unloaded region on each side of a diameter perpendicular to said moment and, at each end of said diameter, a loaded region which creates, upon assembly of the bearing, a pre-stressing comprising an axial component in a direction opposed to the direction of said moment, said apparatus comprising a grinding wheel, a rotary spindle driven by a motor, a workpiece carrying rotary table perpendicular to the axis of rotation of the spindle, elastically yieldable connecting means connecting the table to the spindle, means for biasing the table in a variable manner in the course of the rotation of the table, at least in a direction parallel to the axis of rotation of the table, and means for maintaining a rolling bearing ring coaxially with the table, the elastically yieldable connecting means being capable of rotating the ring about a fixed axis passing roughly through the centre of the rolling bearing ring under the effect of said biasing means.

13. An apparatus according to claim 12, wherein the elastically yieldable connecting means comprise a plurality of flexible elements which are inclined to the axis of rotation of the spindle and have mean lines which converge at the centre of the bearing ring.

* * * * *